US008091089B2

(12) United States Patent
Choi et al.

(10) Patent No.: US 8,091,089 B2
(45) Date of Patent: Jan. 3, 2012

(54) APPARATUS, SYSTEM, AND METHOD FOR DYNAMICALLY ALLOCATING AND ADJUSTING META-DATA REPOSITORY RESOURCES FOR HANDLING CONCURRENT I/O REQUESTS TO A META-DATA REPOSITORY

(75) Inventors: Patricia Driscoll Choi, Apex, NC (US); Mark Edward Thomen, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 1358 days.

(21) Appl. No.: 11/232,536

(22) Filed: Sep. 22, 2005

(65) Prior Publication Data

US 2007/0067368 A1 Mar. 22, 2007

(51) Int. Cl.
*G06F 9/46* (2006.01)
*G06F 15/173* (2006.01)

(52) U.S. Cl. ........................ 718/104; 709/226
(58) Field of Classification Search ............... 718/104
See application file for complete search history.

(56) References Cited

U.S. PATENT DOCUMENTS

| | | | | |
|---|---|---|---|---|
| 5,530,897 | A * | 6/1996 | Meritt | 710/9 |
| 5,897,661 | A * | 4/1999 | Baranovsky et al. | 711/170 |
| 5,951,658 | A * | 9/1999 | Daray et al. | 710/56 |
| 6,009,427 | A * | 12/1999 | Wolff | 1/1 |
| 6,029,168 | A * | 2/2000 | Frey | 707/10 |
| 6,070,202 | A * | 5/2000 | Minkoff et al. | 710/56 |
| 6,170,023 | B1 * | 1/2001 | Beardsley et al. | 710/36 |
| 6,182,109 | B1 * | 1/2001 | Sharma et al. | 718/104 |
| 6,212,499 | B1 * | 4/2001 | Shigeeda | 704/254 |
| 6,526,494 | B1 * | 2/2003 | Kougiiouris et al. | 711/170 |
| 6,879,939 | B1 * | 4/2005 | Lang et al. | 702/186 |
| 7,406,523 | B1 * | 7/2008 | Kruy et al. | 709/227 |
| 7,529,836 | B1 * | 5/2009 | Bolen | 709/226 |
| 7,657,501 | B1 * | 2/2010 | Brown et al. | 707/999.002 |
| 7,693,847 | B1 * | 4/2010 | Brown et al. | 707/694 |
| 7,720,864 | B1 * | 5/2010 | Muth et al. | 707/785 |
| 2003/0126200 | A1 * | 7/2003 | Wolff | 709/203 |
| 2003/0195895 | A1 * | 10/2003 | Nowicki et al. | 707/100 |
| 2004/0088413 | A1 * | 5/2004 | Bhogi et al. | 709/226 |
| 2004/0139434 | A1 * | 7/2004 | Blythe et al. | 718/100 |
| 2004/0215789 | A1 * | 10/2004 | Lu | 709/229 |
| 2004/0221031 | A1 * | 11/2004 | Desai | 709/224 |
| 2005/0066331 | A1 * | 3/2005 | Inoue et al. | 718/104 |
| 2005/0144514 | A1 * | 6/2005 | Ulrich et al. | 714/6 |
| 2005/0234867 | A1 * | 10/2005 | Shinkai | 707/1 |

(Continued)

OTHER PUBLICATIONS

Hani Jamjoom Kang; "Eve: A Scalable Network Client Emulator"; Year: 2003.*

(Continued)

*Primary Examiner* — Qing Wu
(74) *Attorney, Agent, or Firm* — Kunzler Needham Massey & Thorpe (57) ABSTRACT

An apparatus, system, and signal bearing medium are disclosed for dynamically allocating meta-data repository resources. In one embodiment, the present invention includes tracking resources allocated to a meta-data repository, evaluating repository usage of the resources allocated to a meta-data repository to ascertain whether a resource adjustment is desirable, determining the desirable adjustments to the resources allocated to a meta-data repository, and adjusting the allocated resources in accordance with the determined amount. In one embodiment dynamically allocating meta-data repository resources, strings and buffers from volatile memory, will efficiently use necessary resources thereby not misusing essential system memory. By dynamically allocating meta-data repository resources, system and work performance are enhanced increasing productivity.

15 Claims, 5 Drawing Sheets

U.S. PATENT DOCUMENTS

2006/0031230 A1* 2/2006 Kumar ............................ 707/10
2006/0090004 A1* 4/2006 Nikolayev et al. ............ 709/238
2006/0277317 A1* 12/2006 Clark et al. ................... 709/235
2009/0175591 A1* 7/2009 Gondhalekar et al. .......... 386/83

OTHER PUBLICATIONS

Sam Michiels; Lieven Desmet; Nico Janssens; Tom Mahieu; Pierre Verbaeten; "Self-adapting concurrency: the DMonA architecture"; Workshop on Self-healing systems archive, Proceedings of the first workshop on Self-healing systems; pp. 43-48; Year of Publication: 2002.*

Matt Welsh; David Culler; Eric Brewer; "SEDA: an architecture for well-conditioned, scalable internet services"; ACM SIGOPS Operating Systems Review archive; vol. 35, Issue 5 (Dec. 2001); Session: Event-driven architectures; pp. 230-243I; Year of Publication: 2001.*

* cited by examiner

APPARATUS, SYSTEM, AND METHOD FOR DYNAMICALLY ALLOCATING AND ADJUSTING META-DATA REPOSITORY RESOURCES FOR HANDLING CONCURRENT I/O REQUESTS TO A META-DATA REPOSITORY

BACKGROUND OF THE INVENTION

1. Field of the Invention

This invention relates to meta-data repositories and more particularly relates to dynamically allocating meta-data repository resources.

2. Description of the Related Art

A meta-data repository is a dataset that stores information about other datasets and is often referred to as a catalog in industry. Meta-data repositories are crucial in catalog structured operating systems due to the information they store. For example, a meta-data repository may store information about where a dataset resides, the type of information stored in a dataset, when a dataset was created, or other information pertaining to a dataset. Access to the meta-data repository is granted to an incoming request if a resource is available to facilitate the request. Otherwise, the request will not be handled immediately, but will be entered in a queue, such as a first-in-first-out (FIFO) queue, where it will wait for an available resource. Though the current implementations function as intended, apparent flaws currently exist.

For example, if incoming requests exceed the allocated resources, then each request received after the allocated resources are used must wait in the FIFO queue for a resource to become available. Waiting for a resource to become available results in undesirable wait time and poor workload performance. Although the current system would continue to function and deliver the desired information from a meta-data repository, the current system does not provide adequate performance.

Likewise, if an overabundance of resources are allocated to a meta-data repository, then the excessive resources are unavailable to accommodate requests to other meta-data repositories. Not only does this hinder the efficiency of the meta-data repositories involved, but is also a misuse of resources which could be used by the system to function more efficiently since resources are allocated from main memory. Once again, the current system continues to function but at an inefficient level.

Additionally, adjusting the meta-data repository allocation configuration requires a user to manually reconfigure the settings, which may result in undesirable delays and possible errors. To further complicate the matter, there currently exists neither a basis nor methodology to determine a proper resource allocation configuration, so the adjusted meta-data repository allocation configuration may not be correct. Accordingly, even where a user manually adjusts the resource allocation procedures, there is little to ensure the adjustment will be performed properly or even beneficially.

From the foregoing discussion, it should be apparent that a need exists for an apparatus, system, and method for dynamically allocating meta-data repository resources. Beneficially, such an apparatus, system, and method would periodically and automatically allocate meta-data repository resources.

SUMMARY OF THE INVENTION

The present invention has been developed in response to the present state of the art, and in particular, in response to the problems and needs in the art that have not yet been fully solved by currently available solutions. Accordingly, the present invention has been developed to provide an apparatus, system, and method for dynamically allocating meta-data repository resources that overcome many or all of the above-discussed shortcomings in the art.

In one aspect of the present invention, an apparatus for dynamically allocating meta-data repository resources is provided with a logic unit containing a plurality of modules configured to functionally execute the necessary steps of tracking available resources of a meta-data repository, evaluating the number of tracked resources over a selected interval of time, determining an amount of resources to allocate to a meta-data repository, and adjusting the amount of resources of a meta-data repository responsive to the amount determined. These modules in the described embodiments include a tracking module, an evaluation module, a determination module, and an allocation module.

The apparatus, in one embodiment, is configured to track usage of allocated resources of a meta-data repository. A counter may be used to store the tracked occurrences. The tracked occurrences may be evaluated to determine if an adjustment of allocated resources is desirable. If an adjustment of allocated resources is desirable, then the correct amount of resources to allocate to the meta-data repository may be determined. Finally, when an amount of resources to allocate to the meta-data repository is determined, the settings to the repository are adjusted and the repository is reset so the changes can take effect.

The apparatus is further configured, in one embodiment, to increase the amount of resources to a meta-data repository by tracking a maximum amount of concurrent requests stored in a meta-data repository queue over a selected interval. In another embodiment, the apparatus is further configured to decrease the amount of resources to a meta-data repository by a series of mathematical operations which include summing the total amount of unused resources after each request received by the meta-data repository over a selected interval, dividing that sum by the total amount of requests received by the meta-data repository over the same interval, and dividing that quotient with the amount of resources currently allocated to the meta-data repository.

A system of the present invention is also presented to dynamically allocate meta-data repository resources. The system may be embodied in a mainframe computer system. In particular, the system, in one embodiment, includes a system bus, a storage device, a network interface card, a central processing unit (CPU), a main memory, an operating system, an I/O device, and a network backbone to transmit and receive data to and from other devices on the same network.

The system may further include services of the operating system and a meta-data repository. The services may incorporate the modules necessary to dynamically allocate meta-data repository resources. The services and the meta-data repository may both be included in the operating system and stored in main memory. The meta-data repository, in one embodiment, is located in the storage device which communicates with main memory via the system bus. In another embodiment, the system may include a meta-data repository coupled to the network backbone and may reside on a plurality of storage devices shared on the network backbone.

A method and associated signal bearing medium are also presented for dynamically allocating meta-data repository resources. The method in the disclosed embodiments substantially includes the operations necessary to carry out the functions presented above with respect to the described apparatus and system. In one embodiment, the method includes operations to track resources allocated to a meta-data repository, evaluate repository usage of the resources allocated to the meta-data repository to determine if a resource adjustment is desirable, determine the desirable adjustment of resources to allocate to the meta-data repository, and adjust the resources allocated to the meta-data repository.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single dataset, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
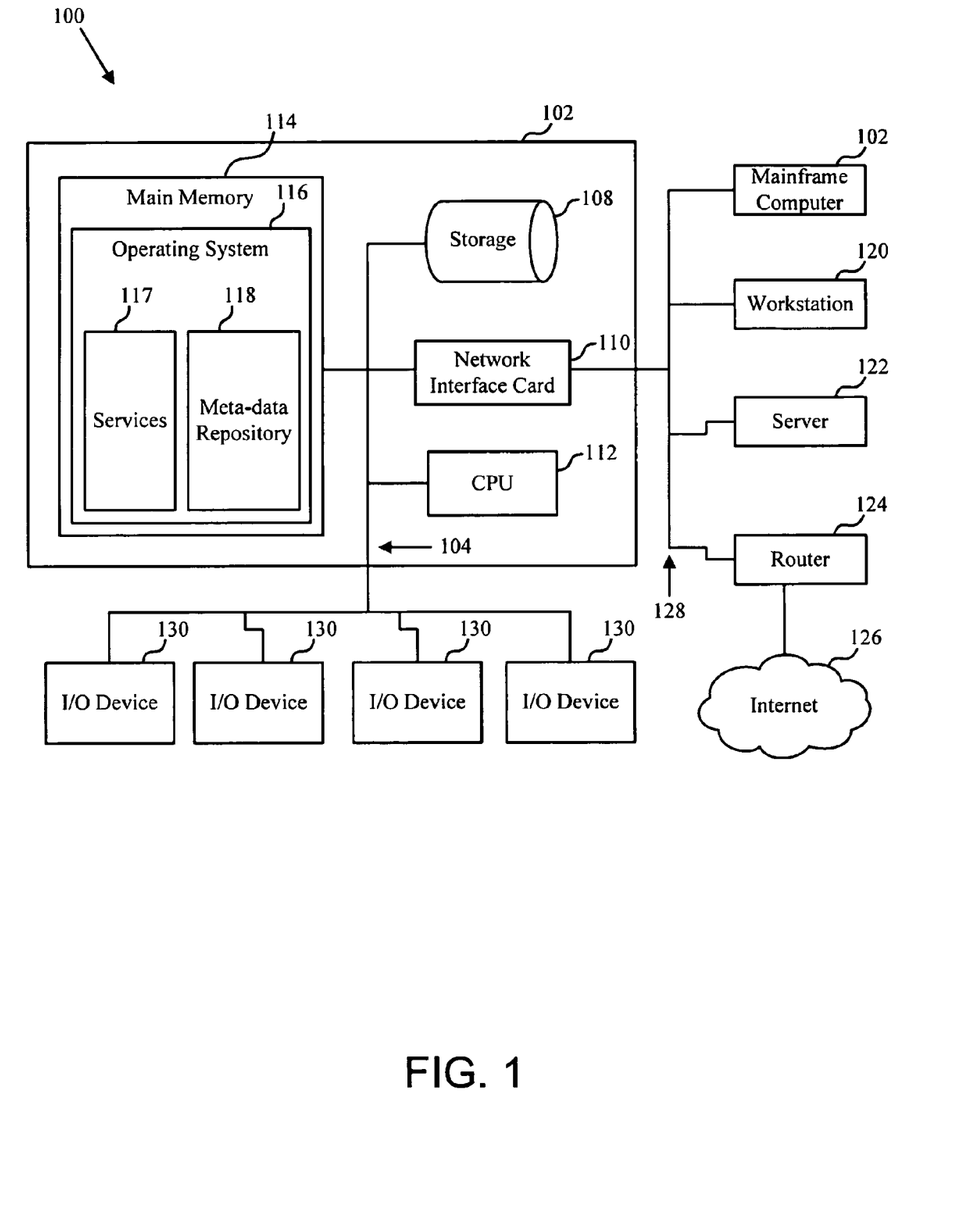
FIG. 1 is a schematic block diagram illustrating one embodiment of a mainframe computer system in accordance with the present invention.

FIG. 1 is a schematic block diagram of a mainframe computer system 100 in accordance with the present invention. The depicted mainframe computer system 100 includes a mainframe computer 102, a system bus 104, a storage device 108, a network interface card 110, a central processing unit (CPU) 112, a main memory 114, an operating system 116, operating system services 117, a meta-data repository 118, a workstation 120, a server 122, a router 124, the Internet 126, a network 128, and input/output (I/O) devices 130. The various components of the mainframe computer system function cooperatively to dynamically allocate meta-data repository resources.

The depicted mainframe computer 102 includes the system bus 104 and various components. The system bus 104 may provide a communication link among components within the mainframe computer 102. The storage device 108 may be a component in the mainframe computer 102. In one embodiment, the storage device 108 stores part of the meta-data repository 118. The storage device 108 may include a variety of devices such as a direct access storage device (DASD), a tape drive, or the like. In certain embodiments, the storage device may be writeable.

The network interface card 110 may communicate with the mainframe computer 102 via the system bus 104. The network interface card 110 may communicate with the network backbone 128. In one embodiment, the network interface card 110 creates a communication link between the system bus 104 and the network backbone 128 enabling the mainframe computer 102 to communicate with devices on the same network backbone 128 such as another mainframe computer 102, a workstation 120, a server 122, or a router 124. The router 124 may have a connection from the network backbone 128 to the Internet 126.

The CPU 112 may be connected to the system bus 104. In one embodiment, the CPU processes and transmits data received over the system bus 104 to components connected to the system bus 104 such as the main memory 114. The main memory 114 may be volatile storage. In one embodiment, the main memory 114 stores the operating system 116, operating system services 117, and the meta-data repository 118. The depicted main memory 114 stores the entire meta-data repository 118. In another embodiment, the main memory 114 stores only a portion of the meta-data repository 118.

The depicted I/O devices 130 communicate with the mainframe computer 102 via the system bus 104. The I/O devices may provide a communication channel from the mainframe computer 102 to a user. The I/O devices may include a monitor, a keyboard, a mouse, and the like.

Figure 2:
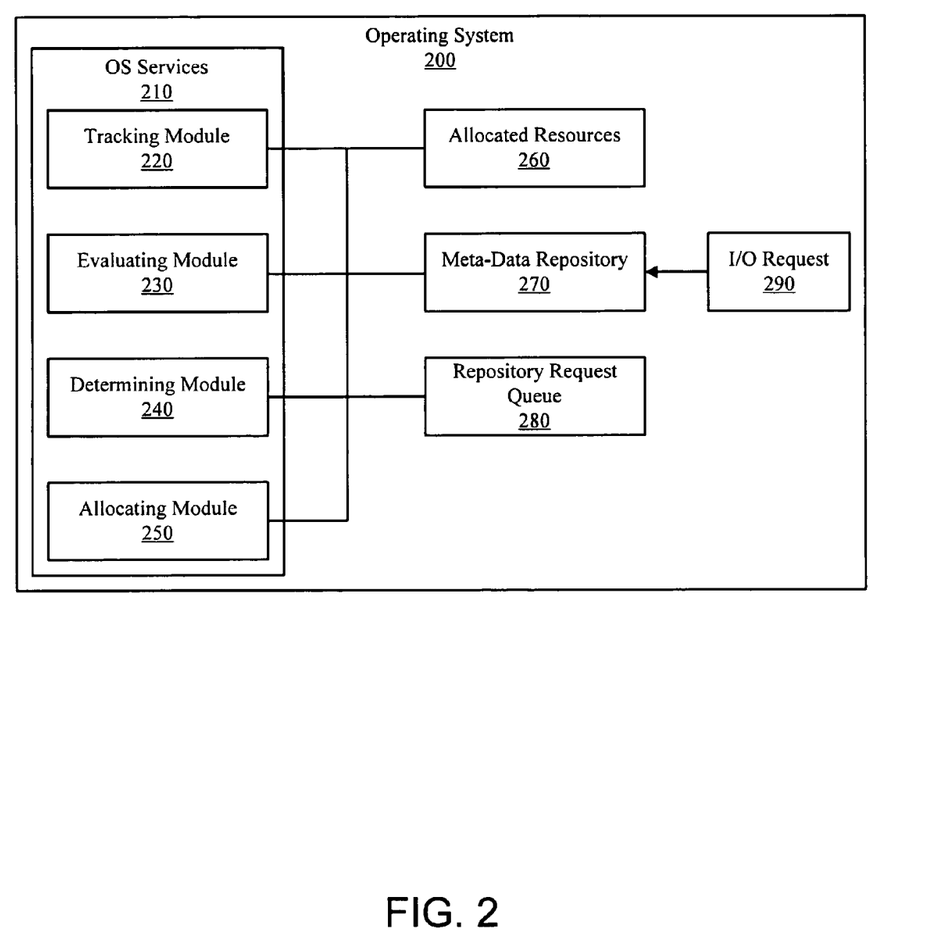
FIG. 2 is a schematic block diagram illustrating one embodiment of an operating system in accordance with the present invention.

FIG. 2 is a schematic block diagram of an operating system 200 in accordance with the present invention. The depicted operating system 200 includes a set of operating system services 210, a tracking module 220, an evaluation module 230, a determination module 240, an allocation module 250, allocated resources 260, a meta-data repository 270, a repository request queue 280, and an input/output (I/O) request 290. The depicted operating system 200 allows for dynamically allocating meta-data repository resources.

The depicted operating system services 210 include the modules necessary for dynamically allocating meta-data repository resources. The tracking module 220 may track allocated resources 260 to a meta-data repository 270. An I/O request 290 may be placed in a repository request queue 280 when there are no available allocated resources 260 to facilitate the I/O request 290. In one embodiment, the tracking module 220 tracks the maximum concurrent enqueued I/O requests. In another embodiment, the tracking module 220 increments a counter by a number of available allocated resources 260 when an I/O request 290 is assigned to an available allocated resource 260.

The evaluation module 230 may evaluate repository usage of the resources available 260 to a meta-data repository 270. In one embodiment, the evaluation module ascertains whether a resource adjustment is desirable by summing the unused, available resources 260 after each I/O request 290 received by the meta-data repository 270 over a selected interval of time to receive a first sum, summing the total amount of I/O requests 290 received by the meta-data repository 270 over the same selected interval of time to receive a second sum, dividing the first sum by the second sum to receive a first quotient, and comparing the first quotient to a tolerance range.

In another embodiment, the evaluation module ascertains whether a resource adjustment is desirable by summing the maximum amount of I/O requests 290 concurrently in a repository request queue 280 over a selected interval to receive a third sum and comparing the third sum to a tolerance range. The tolerance range may be a predefined amount to dictate a decision to adjust allocated resources. In another embodiment, the tolerance range allows varied ranges depending on time of day, importance of the meta-data repository 270, or the like.

The determination module 240 may determine the desirable adjustments of allocated resources 260 to the meta-data repository 270. In one embodiment, the determination module 240 determines the desirable adjustment of allocated resources 260 to the meta-data repository 270 by dividing the first quotient with the total number of current allocated resources 260 to receive a second quotient or desirable adjustment of allocated resources. In another embodiment, the determination module 240 determines the desirable adjustment of allocated resources 260 to the meta-data repository 270 by summing the third sum with the amount of current allocated resources 260 to receive a fourth sum or desirable adjustment of allocated resources.

The allocation module 250 may be given ownership permissions to alter settings of the meta-data repository 270. In one embodiment, the allocation module 250 allocates the second quotient or desirable adjustment of available resources to the meta-data repository 270. In another embodiment, the allocation module 250 allocates the fourth sum or desirable adjustment of available resources to the meta-data repository 270.

The allocated resources 260 may be allocations of main memory used by the meta-data repository to facilitate I/O requests 290. In one embodiment, the available resources 260 consist of a plurality of strings and buffers. A string may be assigned to an I/O request 290 by the meta-data repository 270. In one embodiment, one string is required to facilitate one I/O request 290.

A buffer may be an address space of main memory used to store information from the meta-data repository 270 requested by the I/O request 290. In one embodiment, one buffer is capable of storing the information from the meta-data repository 270 requested by the I/O request 290. In another embodiment, a plurality of buffers are required to store the information from the meta-data repository 270 requested by the I/O request 290.

The meta-data repository 270, in one embodiment, stores information about datasets. A meta-data repository may be a catalog in z/OS. The meta-data repository 270 has an amount of resources allocated to it for facilitating I/O requests 290.

The repository request queue 280 may be a first-in-first-out (FIFO) queue. The depicted repository request queue 280 may enqueue an I/O request 290 when allocated resources 260 are exhausted. In like manner, the repository request queue 280 may dequeue I/O requests 290 to an allocated resource 260 upon availability.

In one embodiment, the I/O request 290 requests an allocated resource 260 of the meta-data repository 270 to facilitate acquisition of information from the meta-data repository 270. In one embodiment, the I/O request originates from the mainframe computer 102 (See FIG. 1) wherein the meta-data repository 270 resides. In another embodiment, the I/O request originates from a workstation 120, server 122, router 124, or Internet 126, capable of communicating on the network backbone 128 where the mainframe computer 102 has communication capability (see FIG. 1).

Figure 3:
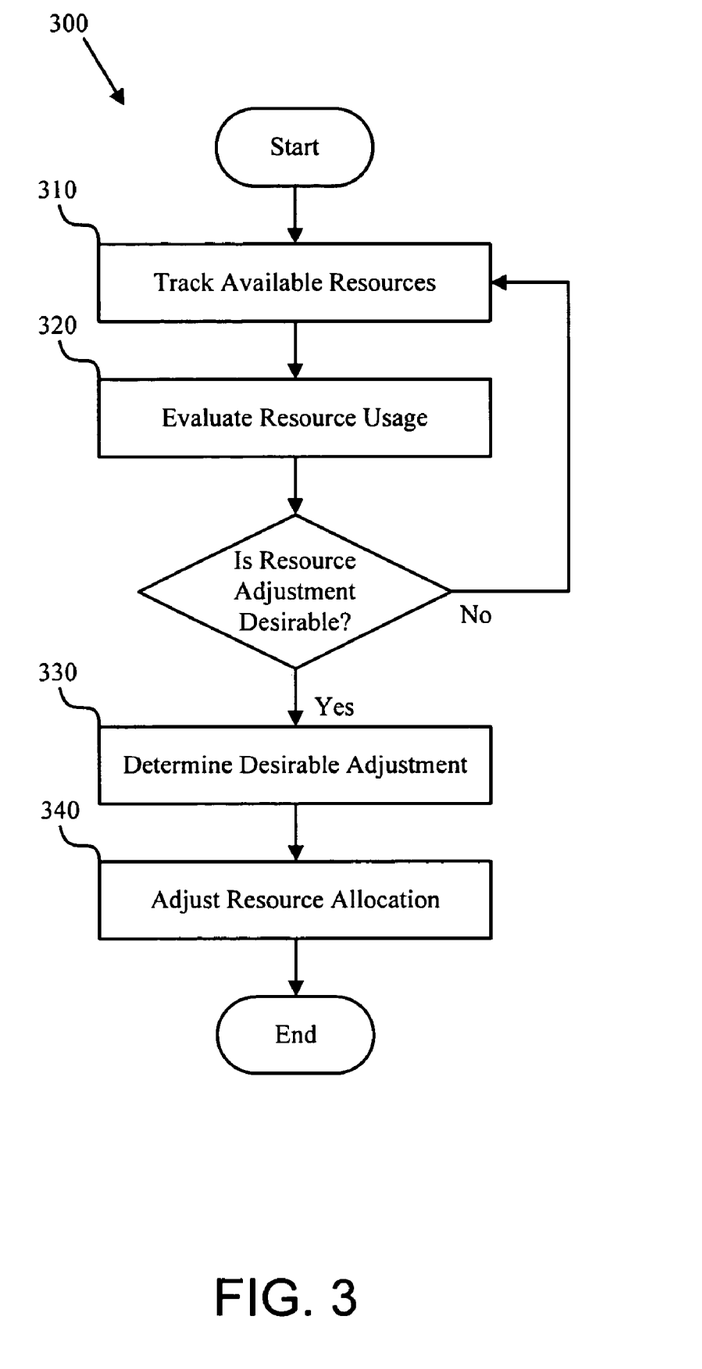
FIG. 3 is a schematic flow chart diagram illustrating one embodiment of a method for dynamically allocating meta-data repository resources in accordance with the present invention.

FIG. 3 depicts one embodiment of a method 300 for dynamically allocating meta-data repository resources. The method 300 includes tracking 310 available resources, evaluating 320 resource usages, determining 330 desirable adjustments, and adjusting 340 resource allocations. The depicted method 300 teaches the operations of dynamically allocating meta-data repository resources.

Tracking 310 allocated resources may include incrementing a counter. In like manner, tracking 310 allocated resources may include decrementing a counter. In one embodiment, tracking 310 allocated resources consists of incrementing a counter when a threshold of I/O requests have been enqueued into the repository request queue. In another embodiment, tracking 310 allocated resources includes incrementing a counter by the amount of available allocated resources of a meta-data repository after an I/O request is assigned to an available resource.

Evaluating 320 resource usages may include acquiring the value of the counter as a first sum, acquiring the total number of requests made as a second sum, dividing the first sum by the second sum to receive a first quotient, and comparing the first quotient with a tolerance range. In another embodiment, evaluating 320 resource usages includes acquiring the value of the counter as a first value and comparing the first value with a tolerance range.

Determining 330 desirable adjustments may include dividing the first quotient by the current amount of resources allocated to the meta-data repository to receive a final quotient. The final quotient is a new amount of resources to be allocated to the meta-data repository. In another embodiment, summing the first value received from evaluating 320 resource usages with the amount of resources currently assigned to the meta-data repository produces a final sum. The final sum may be a new value of resources to be allocated to the meta-data repository.

Adjusting 340 resource allocation may include stopping the meta-data repository, adjusting the resources allocated to the meta-data repository according to the value received by determining 330 desirable adjustments, and starting the meta-data repository for the changes to take effect. Adjusting 340 resource allocation is further discussed in FIG. 4.

Figure 4:
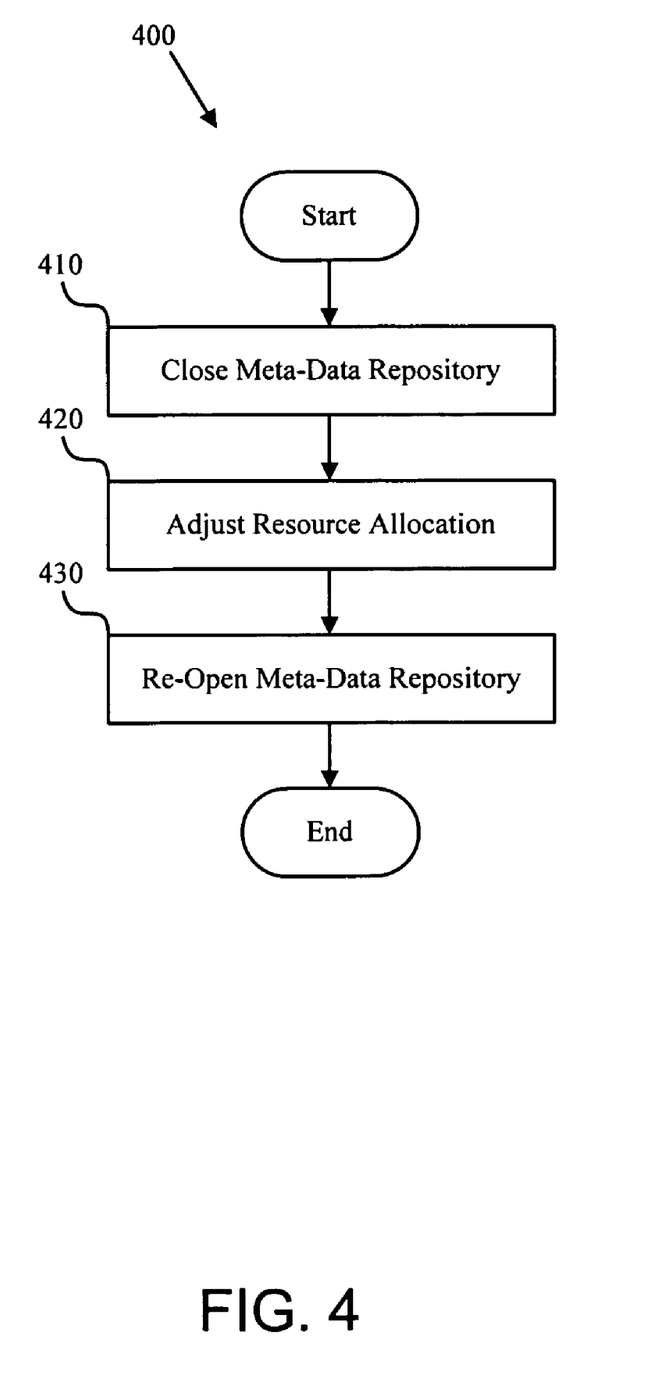
FIG. 4 is a schematic flow chart diagram illustrating one embodiment of a method for adjusting meta-data repository resources in accordance with the present invention.

FIG. 4 depicts one embodiment of a method 400 for adjusting the resources of a meta-data repository. The method 400 includes closing 410 the meta-data repository, adjusting 420 resource allocation, and re-opening 430 the meta-data repository. The depicted method 400 teaches the steps for adjusting the resources of a meta-data repository.

Closing 410 the meta-data repository may include ceasing responses to I/O requests made to the meta-data repository. In one embodiment, an I/O request made to a closed meta-data repository is stored in a FIFO queue. In another embodiment, an I/O requests made to a closed meta-data repository is dropped.

Adjusting 420 resource allocation may include altering settings of a meta-data repository to a predetermined value. In one embodiment, administrator or root privileges must be held to adjust resources. In another embodiment, adjusting 420 resource allocation increases the amount of resources assigned to a meta-data repository. In another embodiment, adjusting 420 resource allocation decreases the amount of resources assigned to a meta-data repository.

Opening 430 the meta-data repository may include applying changes made to settings when the meta-data repository was closed. In one embodiment, opening 430 the meta-data repository includes dequeueing I/O requests stored in a FIFO queue according to the amount of resources allocated to the meta-data repository. Opening 430 the meta-data repository may include sending a signal to the origination of a dropped I/O request.

Figure 5:
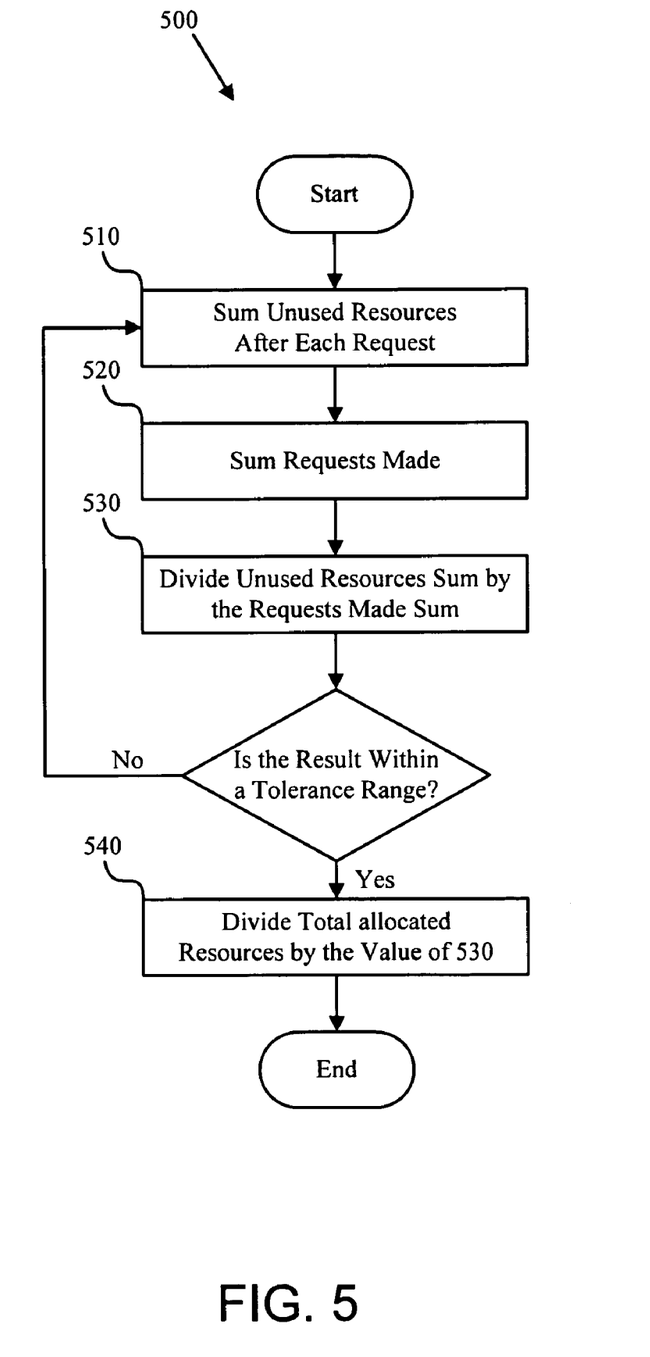
FIG. 5 is a schematic flow chart diagram illustrating one embodiment of a method for determining allocation of meta-data repository resources in accordance with the present invention.

FIG. 5 depicts one sequence 500 to determine the amount of resources to dynamically allocate to a meta-data repository. The sequence 500 includes summing 510 the unused resources after each request, summing 520 the total requests made, dividing 530 the sum 510 of unused resources by the sum 520 of requests made to receive a first quotient for comparison with a tolerance range to decide if an adjustment is desired, and dividing 540 the total allocated resources by the first quotient acquired in step 530. The sequence 500 teaches an operation to determine the amount of resources to dynamically allocate to a meta-data repository.

Summing 510 the unused resources of a meta-data repository after each I/O request received may include a counter to store tracked occurrences. The counter may increment by the amount of unused resources allocated to a meta-data repository after a resource has been assigned to an I/O request. In one embodiment, summing 510 the unused resources of a meta-data repository after each I/O request received includes decrementing the counter if a resource is not available. Likewise, summing 510 the unused resources includes incrementing the counter per an amount of I/O requests forced to wait for an available resource in a FIFO queue.

In like manner, summing 520 I/O requests made to a meta-data repository may include a counter to store tracked occurrences. The counter may increment by the amount of I/O requests received by the meta-data repository. In one embodiment, the counter is reset to zero after a predetermined interval of time.

In one embodiment, summing 510 unused resources produces a first sum and summing 520 I/O requests received produces a second sum. Dividing 530 the first sum by the second sum produces a first quotient. The first quotient may be compared to a tolerance range to make a decision. In one embodiment, the result of the first quotient being compared to a tolerance range is either affirmative or negative.

Dividing 540 the total amount of allocated resources of a meta-data repository by the first quotient received by dividing 530 may produce a final quotient. In one embodiment, the final quotient is an amount of resources to be allocated to a meta-data repository. In one embodiment, the total amount of allocated resources is specific to the mainframe computer the meta-data repository is being requested from.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for dynamically allocating resources used in a meta-data repository, the apparatus comprising:
   a processor;
   a tracking module configured to track resources allocated to a mainframe meta-data repository, a mainframe meta-data repository comprising a repository that stores meta-data related to a mainframe computer, the resources comprising a plurality of strings and a plurality of buffers, wherein each string comprises a resource allocated to handle a single meta-data repository I/O request, a number of strings defining a number of I/O requests to the mainframe meta-data repository that may be handled concurrently, the meta-data repository comprising a repository queue configured to store one or more meta-data repository I/O requests;

an adjustment evaluation module configured to evaluate repository usage of the resources allocated to the meta-data repository and ascertain whether a resource adjustment is desirable, wherein the adjustment evaluation module is configured to evaluate whether a resource adjustment increase is desirable based at least in part on an amount of meta-data repository I/O requests concurrently located in the repository queue, wherein the adjustment evaluation module is configured to evaluate whether a resource adjustment decrease is desirable by determining a first sum comprising the sum of the unused resources after each I/O request over a selected interval, determining a second sum comprising the sum of I/O requests made over the same interval, dividing the first sum by the second sum to produce a first quotient, and comparing the first quotient with a tolerance range to determine whether a resource adjustment decrease is desired, and the adjustment evaluation module is configured to evaluate whether a resource adjustment increase is desirable by determining a third sum comprising a maximum amount of requests concurrently located in the repository queue over the selected interval and comparing the third sum to a tolerance range;

an adjustment determination module configured to determine desirable adjustments to the resources available to the meta-data repository; and an allocation module configured to adjust resources allocated to the meta-data repository in accordance with the adjustment determination module, wherein adjusting resources comprises changing a number of strings allocated to handle concurrent meta-data repository I/O requests;

wherein the tracking module, adjustment evaluation module, adjustment determination module, and allocation module each comprise one or more of hardware and a non-transitory storage medium having stored thereon machine-readable instructions executable by the processor.

2. The apparatus of claim 1, wherein the tracking module is further configured to track resources allocated to a meta-data repository in accordance with a selected interval.

3. The apparatus of claim 1, wherein adjusting resources further comprises changing a number of allocated buffers.

4. The apparatus of claim 1, wherein the adjustment determination module is configured to determine desirable adjustment decreases by dividing the total number of resources available to the meta-data repository by the first quotient to produce the desired resource adjustment decrease; and the adjustment determination module is configured to determine desirable adjustment increases by summing the third sum with the current amount of resources allocated to the meta-data repository to produce the desired resource adjustment increase.

5. The apparatus of claim 1, wherein the allocation module is configured to adjust allocated resources by stopping the meta-data repository, adjusting the resources according to desirable adjustments, and starting the meta-data repository.

6. A system for dynamically allocating meta-data repository resources, the system comprising:

a mainframe computer configured to track resources allocated to a meta-data repository, a mainframe meta-data repository comprising a repository that stores meta-data related to a mainframe computer, the resources comprising a plurality of strings and a plurality of buffers, wherein each string comprises a resource allocated to handle a single meta-data repository I/O request, a number of strings defining a number of I/O requests to the mainframe meta-data repository that may be handled concurrently, the mainframe meta-data repository comprising a repository queue configured to store one or more meta-data repository I/O requests;

at least one I/O device configured to communicate an I/O request to the mainframe computer;

the mainframe computer further configured to evaluate repository usage of allocated resources and determine whether a resource adjustment is desirable, wherein the mainframe computer is further configured to evaluate whether a resource adjustment increase is desirable based at least in part on an amount of meta-data repository I/O requests concurrently located in the repository queue, wherein the mainframe computer is configured to determine whether a resource adjustment decrease is desirable by determining a first sum comprising the sum of the unused resources after each I/O request over a selected interval, determining a second sum comprising the sum of I/O requests made over the same interval, dividing the first sum by the second sum to produce a first quotient, and comparing the first quotient with a tolerance range to determine whether a resource adjustment decrease is desired, and the mainframe computer is configured to determine whether a resource adjustment increase is desirable by determining a third sum comprising a maximum amount of I/O requests concurrently located in the repository queue over a selected interval and comparing the third sum to a tolerance range to determine whether a resource adjustment increase is desired;

the mainframe computer further configured to determine desirable adjustments of resources allocated to the meta-data repository; and the mainframe computer further configured to adjust allocation of resources allocated to the meta-data repository in accordance with the mainframe computer determination, wherein adjusting resources comprises changing a number of strings allocated to handle concurrent meta-data repository I/O requests.

7. The system of claim 6, wherein the mainframe computer is further configured to track resources allocated to a meta-data repository in accordance with a selected interval.

8. The system of claim 6, wherein adjusting resources further comprises changing a number of allocated buffers.

9. The system of claim 6, wherein the mainframe computer is further configured to determine desirable adjustment decreases by dividing the total number of resources available to the meta-data repository by the first quotient to determine the desired resource adjustment decrease; and the mainframe computer is further configured to determine desirable adjustment increases by summing the third sum with the amount of resources allocated to the meta-data repository to determine the desired resource adjustment increase.

10. The system of claim 6, wherein the mainframe computer is configured to adjust allocation of the available resources by stopping the meta-data repository, adjusting the resources according to desirable adjustments, and starting the meta-data repository.

11. A non-transitory storage medium tangibly embodying a program of machine-readable instructions executable by a digital processing apparatus to perform operations for dynamically allocating meta-data repository resources, the operations comprising:

tracking resources allocated to a mainframe meta-data repository, a mainframe meta-data repository comprising a repository that stores meta-data related to a mainframe computer, the resources comprising a plurality of strings and a plurality of buffers, wherein each string comprises a resource allocated to handle a single meta-data repository I/O request, a number of strings defining a number of I/O requests to the mainframe meta-data repository that may be handled concurrently, the meta-data repository comprising a repository queue configured to store one or more meta-data repository I/O requests in response to a lack of allocated resources being available to handle the one or more meta-data repository I/O requests;

evaluating repository usage of the resources allocated to the meta-data repository to determine whether a resource adjustment is desirable, wherein evaluating repository usage further comprises evaluating whether a resource adjustment increase is desirable based at least in part on an amount of meta-data repository I/O requests concurrently located in the repository queue, wherein evaluating meta-data repository usage of resources to determine an adjustment decrease comprises determining a first sum comprising the sum of the unused resources after each I/O request over a selected interval, determining a second sum comprising the sum of I/O requests made over the same interval, dividing the first sum by the second sum to produce a first quotient, comparing the first quotient with a tolerance range to determine whether a resource adjustment decrease is desired, and wherein evaluating meta-data repository usage of resources to determine an adjustment increase comprises determining a third sum comprising a maximum amount of I/O requests concurrently located in the repository queue over a selected interval and comparing the third sum with a tolerance range to determine whether a resource adjustment increase is desired;

determining desirable adjustments to the resources allocated to the meta-data repository; and adjusting resources allocated to the meta-data repository in accordance with determining desirable adjustments, wherein adjusting resources comprises changing a number of strings allocated to handle concurrent meta-data repository I/O requests.

12. The non-transitory storage medium of claim 11, wherein tracking resources allocated to a meta-data repository comprises tracking resources available to a meta-data repository in accordance with a selected interval.

13. The non-transitory storage medium of claim 11, wherein adjusting resources further comprises changing a number of allocated buffers.

14. The non-transitory storage medium of claim 11, wherein determining desirable adjustment decreases to the resources comprises dividing the total number of resources available to the meta-data repository by the first quotient to determine the desired resource adjustment decrease; and determining desirable adjustment increases to the resources comprises summing the third sum with the total amount of resources allocated to the meta-data repository to determine the desired resource adjustment increase.

15. The non-transitory storage medium of claim 11, wherein adjusting allocation of the available resources comprises stopping the meta-data repository, adjusting the resources according to the desirable adjustments, and starting the meta-data repository.

* * * * *